United States Patent [19]

Sewerinson

[11] Patent Number: 4,466,130
[45] Date of Patent: Aug. 14, 1984

[54] TWO PILOT FREQUENCY CONTROL FOR COMMUNICATION SYSTEMS

[75] Inventor: Ake N. Sewerinson, Port Coquitlain, Canada

[73] Assignee: Ael Microtel Limited, Burnaby, Canada

[21] Appl. No.: 432,484

[22] Filed: Oct. 4, 1982

[51] Int. Cl.³ .............................................. H04B 1/16
[52] U.S. Cl. .................................... 455/260; 455/12; 455/71; 455/265
[58] Field of Search ............... 455/12, 51, 71, 258, 455/260, 265, 75; 375/113, 119, 120

[56] References Cited

U.S. PATENT DOCUMENTS

| | | |
|---|---|---|
| 3,370,235 | 2/1968 | Miyagi .................................. 455/12 |
| 3,450,842 | 6/1969 | Lipke . |
| 3,626,426 | 12/1971 | Steinberg ........................... 455/260 |
| 4,188,579 | 2/1980 | Yoshisato . |
| 4,191,923 | 3/1980 | Schelisch ............................. 455/12 |

Primary Examiner—Jin F. Ng
Attorney, Agent, or Firm—Leonard R. Cool

[57] ABSTRACT

Two pilot signals, derived so that there is a predetermined ratio between the frequency difference of the tones and the absolute frequency of either of the pilot signals, are transmitted from a reference station to each of a number of remote stations. At each receiving station, the frequency error is derived from the frequency difference of the two pilot signals, and this frequency error is used to adjust the frequency of the local oscillator.

7 Claims, 3 Drawing Figures

TWO PILOT FREQUENCY CONTROL FOR COMMUNICATION SYSTEMS

BACKGROUND OF THE INVENTION

The present invention relates to a method and circuit arrangement for synchronizing the carrier frequency of a reference station with the local oscillator frequency of each of a plurality of remote stations.

While not limited to such a communication system, the instant invention is directed to the frequency control of remote stations with respect to a reference ground station in a single channel per carrier (SCPC) satellite communication system. Frequency stability is important for SCPC systems because it tends to prevent adjacent channel interference (ACI) which may occur when inadequate separation of the channels is attained; further, it tends to prevent the frequency offset of the carrier from exceeding the demodulator pull-in range. The purpose of a frequency control technique is to correct the frequency errors introduced by the frequency offset of oscillators in the transmission path, including those contributed by the satellite transponders.

Many different frequency control techniques have been used to compensate for the frequency offset which occurs during satellite transmission, and a number of these techniques employ either one or two pilot frequencies. One technique that employs two pilot frequencies is disclosed in U.S. Pat. No. 3,450,842, inventor D. E. W. Lipke, entitled, "Doppler Frequency Spread Correction Device For Multiplex Transmissions", granted June 17, 1969. In this control circuit the frequency difference between the untransmitted pilots is compared to the frequency difference between the received pilots. The reason a comparison is made between the pilots transmitted from a remote station and the local untransmitted difference in pilot frequencies is to change the local oscillator transmitter frequency so as to correct for doppler shift caused by movement of the transmitting and receiving stations relative one to the other.

In U.S. Pat. No. 4,188,579, inventor Akiyuki Yoshisato, entitled, "SSB Transceiver", granted Feb. 12, 1980, the inventor also makes use of two pilot frequencies to obtain frequency correction. In this case the pilot frequencies sent from the one terminal are recovered at the receiver of the other, "remote", terminal. The recovered pilots are used to actuate a control circuit which, in turn, controls a saw-tooth waveform generator which has a continually varying frequency, and is a part of an automatic frequency tuner. The control circuit acts to stop the voltage generator when the demodulated pilot signals have a frequency which is equal to the predetermined frequency, i.e., the absolute values of the frequencies have not been shifted. This is accomplished by the use of two pilot frequency filters which are very narrow band and thus substantially only pass the design frequency. When the pilots are off frequency the filters block transmission. A logic circuit recognizes this condition and the voltage sweep is allowed to change the frequency of the local oscillator. This will continue until the local oscillator frequency is at a frequency that positions the pilot frequencies in the passband of their respective filters. Once the pilot frequencies are passed to the logic circuit, the activity of the voltage sweep is terminated and the local oscillator is held at that frequency until the pilot frequencies are again blocked by the pilot filters.

SUMMARY OF THE INVENTION

A technique for adjusting the local oscillator frequency of a remote radio receiving station to compensate for frequency errors introduced in the transmission of information includes the transmission of highly stable pilot frequency signals of a first frequency and a second frequency from a reference station to said remote station. The first and second frequencies are modified by said frequency errors introduced by local intermediate oscillators and the original pilots appear as third and fourth frequencies at said remote location. These third and fourth frequencies are separated from other signals present and the difference frequency is used as a control input to a voltage controlled crystal oscillator (VCXO).

Also, the separated third and fourth frequencies and the output frequency of said VXCO are used to obtain an error signal which is equal in frequency to twice the frequency error introduced in transmission; and the error signal is converted into a second control signal that is used to adjust the local oscillator frequency.

DETAILED DESCRIPTION

As noted in the background description pilot frequencies are often employed in automatic frequency control systems. These pilot frequencies, generated from a highly stable frequency source at a reference station, are up converted to the transmit frequency with the normal information signal before being transmitted to the remote station where the incoming signal is down converted, and the pilot tones and associated error frequency are recovered. The generation of pilot frequencies and the up conversion and down conversion processes, even including those for satellite communication, are well known and will not be considered here. Also, the adverse effects of frequency offset which occurs during transmission is well documented, and is not disclosed here. For the foregoing reasons only the control circuit employed at the remote site is illustrated as this effects considerable simplification of the drawings and the explanation necessary to an understanding of the instant invention. However, in the following discussion it will be necessary to briefly refer on occasion to some of those elements. This will be done where it is felt necessary for a more complete understanding of the various circuit functions.

Figure 1:
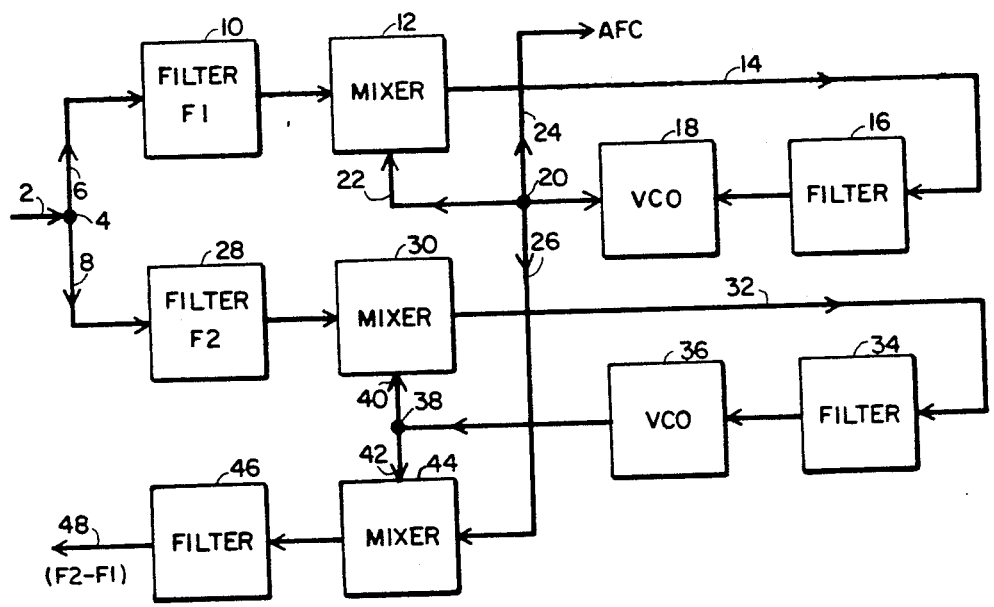
FIG. 1 is a block diagram showing a prior art technique in which two pilot frequencies are employed for the purpose of controlling the frequency of the local oscillator at a remote station.

A prior art technique is illustrated in FIG. 1. The transmitting section is not shown but, as noted above, such transmitters are well known as well as the techniques by which pilot frequencies having a precise difference frequency may be generated. Of course at the transmitting site, the frequencies are passed along with the associated information signals and up converted to the radio carrier frequency for radio transmission. At the receiver they are down converted to an intermediate frequency and the pilot signals would then appear on path 2. In this prior art example the frequencies F1 and F2 are the two pilots and they are different by a precise amount which could be, for example, 5 MHz, and F2 is greater than F1. These pilot frequencies F1 and F2 are applied via path 2 junction 4 and then via paths 6 and 8 respectively to the associated filters 10 and 28 which pass only the pilot frequency indicated. Each of the pilot frequencies are applied to an associated phase lock loop comprising elements 12, 16 and 18, and paths 14 and 22; and elements 30, 34 and 36 and paths 32 and 40, respectively. The purpose of the phase lock loops is to provide replicas of each received pilot tone with improved signal to noise ratio. VCO 18 is tuned to frequency F1, and VCO 36 to frequency F2. Because phase lock loops are well known, they will not be further discussed here. The outputs of VCO's 18 and 36 are applied to inputs of mixer 44 via junctions 20 and 38 and paths 26 and 42, respectively. The output of mixer 44 is applied to selection filter 46 which passes the difference frequency of the two pilot tones and these appear on path 48, and provide a signal with the same stability as the high stability reference signal used in the reference station. Thus, the two highly stable pilot tones have provided a means for the dissemination of the reference frequency. One of the pilot tones is fed via junction 20 and path 24 to a conventional AFC circuit. Note, however, that the difference frequency is not used in generating the AFC voltage, and the AFC signal is not directly used to derive the local oscillator control signal.

Figure 2:
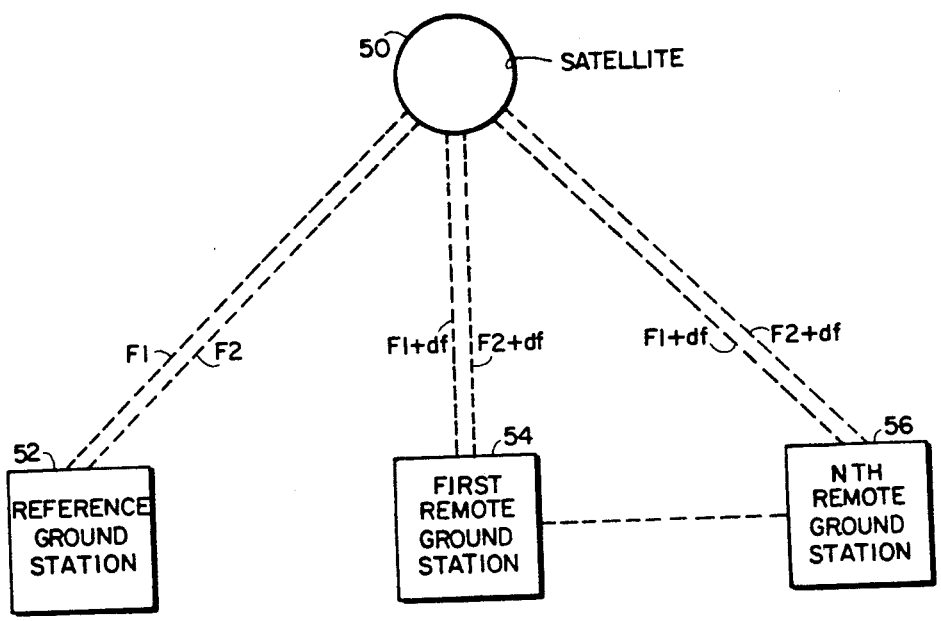
FIG. 2 is a schematic representation of a satellite communitcations system in which there is a reference ground station, a satellite and a number of remote ground stations; and it illustrates the error effect (df) introduced in the pilot frequencies during transmission.

Referring now to FIG. 2 the environment in which the present invention was initially designed to operate is illustrated. The two pilot frequencies F1 and F2 are generated in the reference ground station 52. This ground station 52 may be located relatively near a major metropolitan area and will be arranged to provide communication between customers in that area with customers in remote locations via the satellite 50. Because the techniques by which this kind of communciation may be accomplished are well known they are not illustrated here. Suffice it to say that the pilot frequencies F1 and F2 are derived from a frequency generation source so that there is a predetermined ratio between the frequency difference of the two pilot tones and the absolute frequency of any one of the tones. This may be expressed as follows:

$$F2 - F1 = k1/n1 * F1 \quad (1)$$

and $$f2 - F1 = k2/n2 * F2 \quad (2)$$

where k1, k2, n1 and n2 are integers. The frequency error of the shift oscillators in the transmission path, and this includes those in the satellite, introduces a frequency offset, frequency error, at the receiver which is a resultant of the individual oscillator frequency errors. We call this offset df and this is illustrated in the path from the satellite 50 to the first remote ground station 54, FIG. 2. As may be seen in the figure, the frequency offset, frequency error, df, is the same for signals transmitted from the reference station to each of the ground stations. However, the error introduced in the down conversion process by each oscillator may be different.

Reverting back to the generation of the pilot tones it should be noted that the following conditions also apply:

$$F1 = k1 * fr \quad (3)$$

$$F2 = k1 * fr \quad (4)$$

where fr is a reference frequency and k1 and k2 are related as $$k1 = k2 + k \quad (5).$$

Figure 3:
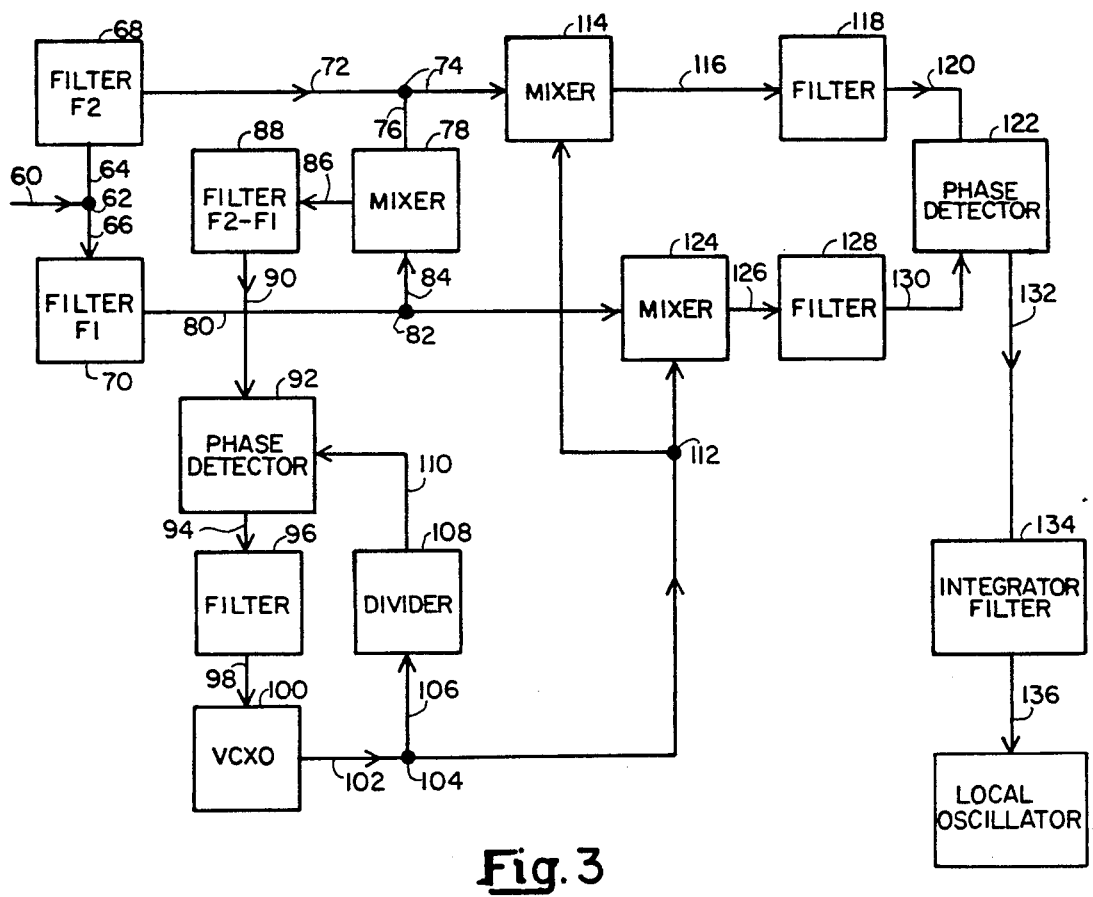
FIG. 3 is a block diagram of a preferred embodiment of the instant invention in which an automatic frequency control system, in response to the frequency error introduced in transmission, provides a control signal for correction of the local oscillator at a remote ground station.

As is well known the pilot frequencies may be generated from the combination of a base frequency with a predetermined modulation frequency, and the sum and difference frequencies at the output of the modulator are selected as the two pilot tones. For the embodiment shown in FIG. 3, it is to be understood that the base frequency selected was 70 MHz and the modulation frequency was selected as 5/11 MHz. This combination provides pilot frequencies of F1 = (7 − 5/11) MHz and F2 = (70 + 5/11) MHz. These frequencies would appear after down conversion on path 60 of the receiver at a remote station, and would be applied respectively via junction 62 and paths 64 and 66 to filter 68 and filter 70. Filter 68 selects a narrow frequency band around F2, being just wide enough to pass the incoming signal F2 + df and connects this signal to path 72. Filter 70 selects a frequency band around the pilot frequency F1 and is wide enough to pass the incoming signal F1 + df to path 80. The frequency outputs from the filters 68 and 70 are applied via separate inputs to mixer 78 and the sum and difference frequencies appear at the output on path 86 where they are applied to filter 88. The difference frequency is selected by filter 88 and thus the frequency passed to path 90 is equal to two times the modulation frequency, i.e., 10/11 MHz, the error offset being eliminated by taking the difference between F2 + df and F1 + df. This difference frequency, F2 − F1, is applied as a control frequency toone input of phase detector 92 which is in the phase lock loop of voltage controlled crystal oscillator 100. This oscillator is operating at a frequency of 70 MHz and its output frequency is applied along path 102, junction 104 and path 106 to the input of divider 108. Divider 108 provides a division of 77 so that the output frequency on path 110 will be 10/11 MHz, assuming that the oscillator 100 output is 70 MHz. The output of divider 108 is applied to a second input of phase detector 92 and the two 10/11 MHz input signals are compared; and, where there is a difference, this difference is used to derive a control signal at the output of the phase detector 92. This control signal is applied via path 94 to low pass filter 96, which controls the bandwidth of the phase lock loop; and the filtered control signal is applied via path 98 to the control input of voltage controlled crystal oscillator 100.

The output of filter 68 is also applied via path 72 through the modulation input of mixer 114, and the carrier frequency for mixer 114 is obtained from the voltage controlled crystal oscillator 100 via path 102 and junctions 104 and 112. Sum and difference frequencies are generated in mixer 114, and the difference frequency, i.e., the modulation frequency plus the offset (5/11 + df) MHz is selected by filter 118, and is passed on to path 120. This frequency is applied to a first input of phase detector 122. Also, the output of filter 70 is applied via path 80 to the modulation input of mixer 124, and the carrier frequency is obtained from the voltage controlled crystal oscillator 100 again via path 102 junctions 104 and 112. Filter 128 selects the difference frequency, i.e., the modulation frequency minus the offset frequency $(5/11-df)$ MHz, appearing on path 126, and this difference frequency is applied on path 130 to a second input of phase detector 122. Because the input frequencies to the phase detector are $(5/11+df)$ MHz and $(5/11-df)$ MHz, the detector will identify the difference between the two applied frequencies, i.e., $2df$ which is equal to twice the error or offset frequency. This phase detected signal is applied via path 132 to the input of integrator filter 134 to obtain an automatic frequency control voltage. This control voltage is then passed via path 136 to the frequency control input of the voltage controlled local oscillator, and thus the frequency control loop is completed.

What is claimed is:

1. Apparatus for adjusting the local oscillator frequency of a remote radio receiving station to compensate for frequency errors introduced in the transmission of information including highly stable pilot frequency signals of a first frequency and a second frequency transmitted from a reference station to said remote station, said first and second frequencies being modified by said frequency errors, resulting in third and fourth frequencies that are present at said remote location, comprising at said remote station:
   first means for separating said third and fourth frequencies and applying these frequencies along separate paths;
   second means for combining said third and fourth frequencies to obtain the difference there-between;
   a voltage controlled crystal oscillator (VCXO) having a control loop by which a control signal is applied to adjust said oscillator frequency;
   third means for deriving a first control signal from said difference frequency and applying said control signal to the control loop of said VCXO;
   fourth means responsive to the separated third and fourth frequencies and to the output frequency of said VXCO to obtain an error signal which is equal in frequency to twice the frequency error introduced in transmission; and
   means for converting said error signal into a second control signal for adjusting said local oscillator frequency.

2. Apparatus as set forth in claim 1 wherein said first and second frequencies are derived by modulating a base frequency with a modulation frequency to provide sum and difference frequencies, corresponding to said first and second frequencies at the reference station.

3. Apparatus as set forth in claim 2 wherein second means comprises:
   a first mixer in which the third and fourth frequencies are combined so as to obtain the sum and difference frequencies; and
   filter means for selecting the difference which is equal to twice said modulating frequency.

4. Apparatus as set forth in claim 3 wherein said fourth means comprises:
   first combining means accepting said separated third frequency and the output frequency from said VCXO to obtain a fifth frequency which is the sum of modulation frequency and the error frequency;
   second combining means accepting said separated fourth frequency and the output frequency of said VCXO to obtain a sixth frequency which is the difference between said modulation frequency and the error frequency; and
   phase detecting means accepting said fifth and sixth frequencies and providing at an output said error signal which is equal in frequency to twice the frequency error introduced in transmission.

5. Apparatus as set forth in claim 4 wherein said first combining means comprises:
   a second mixer having inputs adapted to receive, respectively, the third frequency and said VCXO frequency; and
   a filter designed to select the fifth frequency from those present at its input.

6. Apparatus as set forth in claim 5 wherein said second combining means comprises:
   a third mixer having inputs adapted to receive, respectively, the fourth frequency and said VCXO frequency; and
   a filter designed to select the sixth frequency from those present at the output of said third mixer, and providing said sixth frequency at an output.

7. Apparatus as set forth in claim 6 wherein said third means comprises:
   said filter means which is designed to select said difference frequency from those present at the output of the first mixer which frequency is twice that of said modulation frequency and is substantially error free, the base frequency and error frequency each being subtracted out by the combining of said third and fourth frequencies; and
   a second detector having as one input the output of said third filter and as a second input a divided output from said VCXO.

* * * * *